United States Patent [19]

Schaefer

[11] Patent Number: 4,983,245

[45] **Date of Patent: * Jan. 8, 1991**

[54] PROCESS FOR MAKING DRESSED LEATHERLIKE COMPOSITES

[76] Inventor: Philipp Schaefer, Oberstrasse 16, D-3000 Hanover, Fed. Rep. of Germany

[ * ] Notice: The portion of the term of this patent subsequent to Oct. 17, 2006 has been disclaimed.

[21] Appl. No.: 339,200

[22] Filed: Apr. 14, 1989

Related U.S. Application Data

[63] Continuation-in-part of Ser. No. 206,945, Jun. 9, 1988, abandoned, which is a continuation of Ser. No. 784,866, Oct. 4, 1985, abandoned.

[30] Foreign Application Priority Data

Oct. 6, 1984 [DE] Fed. Rep. of Germany ....... 3436751

[51] Int. Cl.[5] ........................ B44C 1/165; B05D 1/36; B32B 27/36

[52] U.S. Cl. .................................... 156/231; 156/239; 156/246; 427/262; 427/412; 264/213

[58] Field of Search ............... 156/230, 231, 238, 239, 156/249, 307.5, 331.4, 240, 219, 220, 344, 246; 428/151, 323, 87, 95, 423.4, 52, 521, 522, 504, 904, 261; 128/591, 581; 264/213; 427/262, 412, 421, 258

[56] References Cited

U.S. PATENT DOCUMENTS

| | | | |
|---|---|---|---|
| 4,219,376 | 8/1980 | Roman | 427/412 |
| 4,474,836 | 10/1984 | Lukoschek et al. | 427/412 |
| 4,510,302 | 4/1985 | Kolb et al. | 428/52 |
| 4,543,144 | 9/1985 | Thoma et al. | 156/230 |
| 4,572,196 | 2/1986 | Prahl | 128/591 |
| 4,581,261 | 4/1986 | Schaefer et al. | 428/151 |
| 4,740,407 | 4/1988 | Schaefer et al. | 428/87 |
| 4,874,449 | 10/1989 | Schaefer et al. | 156/246 |

*Primary Examiner*—Michael W. Ball
*Assistant Examiner*—Louis Falasco
*Attorney, Agent, or Firm*—Herbert Dubno; Andrew Wilford

[57] ABSTRACT

The invention also relates to a process for dressing a flat, water-absorbing and water-permeable substrate having a rough surface with depressions at least on that side to be provided with the dressing.

64 Claims, 7 Drawing Sheets

PROCESS FOR MAKING DRESSED LEATHERLIKE COMPOSITES

CROSS REFERENCE TO RELATED APPLICATION

This application is a continuation-in-part Ser. No. 07/206,945 filed June 9, 1988, now abandoned as a continuation of Ser. No. 06/784,866 filed Oct. 4, 1985 and now abandoned.

FIELD OF THE INVENTION

The invention relates to a process for making dressed leatherlike substrates and, more particularly, to a process for dressing leather, split leather or nonwoven needled fleece of natural or synthetic fibers and other materials having at least one side with depressions and having on at least one side absorbent protruding fibers to be provided with a dressing.

The invention also relates to a process for dressing a flat, water-absorbing and water-permeable substrate having a rough surface with depressions at least on that side to be provided with the dressing. The term "substrate" is understood to mean soft leather as well as a material made of textile fibers. The leather and textile material both have a rough surface which is provided with the dressing. The roughness of the leather surface can be achieved by splitting and/or milling of the surface to be provided with the dressing. A material consisting of textile fibers must have a surface of similar quality on the side to be provided with the dressing and a thickness of at least 0.8 mm.

The term "leatherlike layer" as used herein will be understood to mean leather itself having a surface to be dressed, a split leather or nonwoven needled fleece of natural or synthetic fibers or so-called "split" having a rough absorbent surface to be dressed and from which fibers of leather may protrude, synthetic compositions containing leather fibers, and even textile substrates, especially nonwoven fleeces of natural and synthetic fibers, with or without leather fibers, and most preferably needled nonwoven fleeces, wherein the textile substrates, like split, have fibers protruding at one surface of the substrate and adapted to be imbedded in the dressing to be applied to that surface. Wherever the term "split leather" or similar terms are used herein, therefore, it will be understood that I also mean to include therein the textile substrates mentioned and which have very similar characteristics to split and can benefit from the advantages of the invention as well as split.

BACKGROUND OF THE INVENTION

It is already known to provide split leather or nonwoven needled fleece of natural or synthetic fibers with a dressing having a structured surface, for example a surface structured like leather grain. In this case, a liquid and wet compound forming the dressing is directly applied to the top surface of the split leather, for example by pouring, spreading, rolling, spraying or printing, or by a roller coating machine, and is then solidified by drying. For giving the dressing the structured surface of leather grain, the dressed split leather or nonwoven needled fleece of natural or synthetic fibers must be embossed after the liquid dressing compound has been dried or solidified. Such embossing of the split leather or nonwoven needled fleece of natural or synthetic fibers is effected in an embossing press under the action of heat and of a very high pressure. The structure of the split leather or nonwoven needled fleece of natural or synthetic fibers and of the dressing is thereby changed in an undesired manner. The thickness of the dressed split leather or nonwoven needled fleece of natural or synthetic fibers is not only reduced but the hardness and stiffness of the split leather or nonwoven needled fleece of natural or synthetic fibers is also increased. Furthermore, the vapor permeability, if any, of the dressing is reduced or destroyed, because during the embossing operation the pores existing within the dressing are again closed or destroyed, respectively, under the action of heat and pressure.

A substantial drawback of this known process resides in the fact that, for producing the dressing only thermoplastic materials deformable under the action of heat and pressure can be used, because otherwise subsequent production of the structured surface by subsequently embossing the solidified dressing would not be possible. Such thermoplastic synthetic plastics materials have, however, poorer properties than non-thermoplastic or less thermoplastic materials.

It is an additional drawback that production of the structured surface by embossing must be effected in a separate process step, which means that the dressed split leather or nonwoven needled fleece of natural or synthetic fibers must be further treated, i.e. must, as a rule, manually be inserted into an embossing press.

It is also known to apply the liquid dressing compound not directly onto the split leather or nonwoven needled fleece of natural or synthetic fibers but in several layers onto a support which is provided with an anti-adhesive coating and having a surface corresponding to the desired structure. The split leather or nonwoven needled fleece of natural or synthetic fibers is placed on the last layer while it is still wet and subsequently the thus dressed split leather or nonwoven needled fleece of natural or synthetic fibers is pressed within a roll press and/or is subjected to a vacuum treatment. In this manner, an undesired rigidifying and undesired increase in hardness and an undesired reduction of the thickness of the dressed split leather or nonwoven needled fleece of natural or synthetic fibers is substantially avoided, but the bond strength between the dressing and the split leather or nonwoven needled fleece of natural or synthetic fibers is reduced.

Further, it has already been proposed to first apply part of the dressing onto a supporting base and to allow solidification of the dressing and to apply a further part of the dressing onto one side of the split leather or nonwoven needled fleece of natural or synthetic fibers and to place this split leather or nonwoven needled fleece of natural or synthetic fibers with the dressing compound applied thereon, still in a wet state, onto the supporting base such that the side of the split leather being provided with the dressing rests on the solidified dressing applied to the supporting base and so that the dry side of the split leather or nonwoven needled fleece of natural or synthetic fibers having no dressing applied thereon shows in upward direction. The supporting base has, in this case, the negative shape of the desired surface of the dressing having the appearance of leather grain, so that, on drying the dressing compound under the action of low pressure, the dressing is given an appearance similar to that of leather grain. In this manner, the dressing is structured such that the thickness, the softness and the steam permeability of the split leather or nonwoven needled fleece of natural or synthetic fibers are not or are only scarcely changed. Dressed split leathers or nonwoven needled fleece of natural or synthetic fibers produced in such a manner thus are soft, supple and have an appearance and properties most similar to that of full-grain leather. The substantial drawback of this known procedure resides, however, in the fact that the split leather or nonwoven needled fleece of natural or synthetic fibers must manually be turned upside down immediately after the wet dressing compound has been applied for full contact between the supporting base, having a corresponding structure, at that side of the split leather or nonwoven needled fleece of natural or synthetic fibers which has been provided with the dressing compound and faces downwardly. In particular in connection with split leather or nonwoven needled fleece of natural or synthetic fibers of large area, manually turning over results in considerable difficulties and in great physical stress. Furthermore, air is included between the supporting base and the side of the split leather or nonwoven needled fleece of natural or synthetic fibers being provided with the dressing when manually turning over the split leather or nonwoven needled fleece of natural or synthetic fibers and placing same onto the supporting base, which substantially impairs the bonding strength of the dressing and the appearance of the dressing provided with the structure similar to leather grain at those areas where the air inclusions are present. This appearance is further impaired by damaging a still wet dressing when gripping the split leather or nonwoven needled fleece of natural or synthetic fibers for manually turning over same and by the necessity of subsequent shifting the split leather or nonwoven needled fleece of natural or synthetic fibers when it has not been placed on the supporting base in the correct position.

OBJECTS OF THE INVENTION

It is an object of the present invention to provide a dressed leatherlike material in which the dressing having a structured surface can be made very thin but in which an inseparable bond between the leather and the dressing is reliably provided.

It is a further object of the present invention to provide a dressed leatherlike material in which the excellent properties of natural leather, such as for example its vapor permeability are maintained.

It is a further object of the invention to provide a dressed leatherlike layer which has a nice appearance with respect to shape, noting that the surface of the dressing can be shaped such that it fully corresponds to the appearance of a natural leather. Further, a dressed leather shall be provided, in which, on tensioning, the visible surface of the dressing is not changed in an undesired manner and, above all, the dressing is not peeled off the leather.

A further object of the invention is to form the leatherlike material such that the coarse fibrous structure, in particular of split leather or nonwoven needled fleece of natural or synthetic fibers , is not apparent on the surface of the dressing.

In addition, it is an object of the present invention to provide a process and an apparatus which can produce a dressed leather in a simple and reliable manner. In particular, continuous production according to a conveyor-line system shall be possible.

It is a still further object of the invention to reduce as far as possible the operations becoming necessary when changing the color of the dressing.

It is a further object of the invention to design the process in such a manner that the aqueous dispersion of plastics material sprayed onto a supporting base having a surface of silicon caoutchouc does not shrink prior to partial solidification, but instead forms a coherent film.

A further object of the invention is the provision of a dressed substrate, the softer and lighter inner layer assuring that the soft substrate, in particular leather, does not harden, while the harder and heavier, but thinner outer layer assures the required surface properties such as resistance to scuffing and scratching.

It is a further object of the invention to provide a process in which the fleshside of split (the side facing the flesh of the animal), of cowhide as well as pigskin, can be provided with an attractive dressing although this side is on very coarse structure and in the case of pigskin, holes are created by the removal of the bristles and have to be filled up by the dressing which still presents a smooth surface.

It is a further object of the invention to provide a process for producing a dressed substrate wherein the surface of the dressing can have the structure of shagreen as well as the structure of ground grain leather (nubuk leather).

SUMMARY OF THE INVENTION

These objects and others which will become apparent hereinafter are attained, in accordance with the invention, in a process for dressing leather itself having a surface to be dressed, a split leather or nonwoven needled fleece of natural or synthetic fibers or so-called "split" having a rough absorbent surface to be dressed and from which fibers of leather may protrude, synthetic compositions containing leather fibers, and even textile substrates, especially nonwoven fleeces of natural and synthetic fibers, with or without leather fibers, and most preferably needled nonwoven fleeces, wherein the textile substrates, like split, have fibers protruding at one surface of the substrate and adapted to be imbedded in the dressing to be applied to that surface.

According to the invention, a silicone-rubber matrix having a textured surface formed with a textured pattern corresponding to that of natural leather is heated to a temperature in excess of 70° C. and a coating is applied to the heated matrix of an aqueous liquid containing a film-forming compound and the coating is dried to form a small-thickness first layer containing micropores.

A coating roll is used to apply to a surface of the web of leatherlike material having fibers protruding from a side thereof an aqueous synthetic-resin dispersion in an amount of 150 to 450 $g/m^3$ by rotating the roll periphery in contact with the web surface so that the roll periphery moves relative to this side of the web and the dispersion is thereby worked into the web and the protruding fibers worked into the second layer thereby formed. The second layer has a thickness substantially greater than the first layer thickness.

Then the web is roll-pressed against the matrix so that the second layer is contacted with and bonded to the first layer. The two layers, with the leather, split or needled-fleece textile substrate, are then peeled from the silicone-rubber matrix.

The invention can also been seen as a process for producing a dressed, flat, water-absorbing and water-permeable substrate having a rough surface with depressions at least on the side to be provided with the dressing, comprising the steps of:

(a) heating a supporting base advancing between the individual process steps and having an upper side which is textured and consists of silicone rubber and an underside supported on a carrier means made of metal, substantially by supplying heat to the carrier means made of metal;

(b) spraying a first thin-flowing cross-linkable aqueous plastic material dispersion onto the upper side of the supporting base heated to such a temperature in at least one operation, namely, in an amount so that at least 20 seconds after the spaying operation, at least 10 percent by volume of the water contained in said first plastic material dispersion is evaporated;

(c) heating the support base further substantially by supplying heat to the carrier means made of metal for a presolidification of the first plastic material dispersion sprayed onto the heated supporting base by further evaporation of water to form a first, outer layer of the dressing in such manner that the pre-solidified first plastic material dispersion contains thereafter only a maximum of 15 percent by volume of water, while substantially, a texture is formed in situ on the surface of this first, outer layer adjacent the textured upper side of the supporting base;

(d) applying a second, thick-flowing, highly viscous, cross-linkable, polyurethane-containing plastic material dispersion in an amount of between 100 and 450 $g/m^2$ onto the surface of a flat, water-absorbing and water-permeable substrate to be dressed, by means of at least one rotating applicator roll, the substrate advancing in the direction of the supporting base on whose upper side the pre-solidified first aqueous plastic material dispersion forming a first, outer layer of the dressing is disposed, such that a relative movement exists between the periphery of the applicator roll and the advancing substrate so that the second aqueous plastic material dispersion is massaged into the surface of the substrate;

(e) placing the surface of the flat, water-absorbing and water-permeable substrate provided with the second aqueous plastic material dispersion onto the pre-solidified first aqueous plastic material dispersion disposed on the upper side of the supporting base and forming the first outer layer, the second aqueous plastic material dispersion still being in a wet state, and pressing the flat, water-absorbing and water-permeable substrate onto the advancing supporting base with a pressure such that full surface contact is established between the still wet second aqueous plastic material dispersion and the pre-solidified first aqueous plastic material dispersion disposed on the upper side of the supporting base;

(f) heating the carrier means on which the supporting base is disposed to a temperature of at least 40° C. for a period of at least 15 seconds, the water contained in the second aqueous plastic material dispersion or the vapor generated from the water on heating the supporting base first being taken up by the flat, water-absorbing and water-permeable substrate and subsequently being at least partially passed out through the substrate, and the second aqueous plastic material dispersion solidifying for forming a second, inner layer of the dressing, the depressions in the surface of the substrate being essentially completely filled up by the second aqueous plastics material dispersion forming said second, inner layer of the dressing; and (g) finally removing the substrate provided with the dressing formed of the two layers from the heated supporting base.

The supporting base can be provided with a reinforcement at least partially embedded therein or on the underside of which a reinforcement can be affixed.

The reinforcement of the supporting base can consist of a net, a nonwoven fabric, a fabric, a material, a glass fiber metal, or a textile material.

The supporting base together with the reinforcement can have a density of more than 1.1 $g/cm^3$ and the supporting base can have an upper side which has the texture of grained leather, e.g. ground grained leather (nubuk leather).

According to the invention, a first aqueous polyurethane-containing plastic material dispersion is sprayed onto the upper side of the needed supporting base. This dispersion is preferably an aqueous, aliphatic, polyurethane-containing plastic material dispersion.

The first aqueous plastic material dispersion can be sprayed onto the upper side of the heated, continuously advancing supporting base means of at least one spraying nozzle disposed above the said upper side of the supporting base, e.g. in at least two successive operations. More specifically, the aqueous plastic material dispersions sprayed onto the upper side of the heated supporting base in different successive operations are at least partially of different compositions. The first aqueous plastic material dispersion can be sprayed onto the upper side of the heated supporting base in an amount of less than 185 $g/m^2$ and in such an amount that a first, outer layer of the dressing of a mean thickness of less than 0.1 mm is formed.

The properties of the first aqueous plastic material dispersion can be such that after spraying onto the heated upper side of the supporting base, a first, outer layer of the dressing of a hardness of between 70 and 100 Shore A and a density of more than 1.05 $g/cm^3$ is formed.

The first aqueous plastic material dispersion can have a solids content of more than 30 percent by volume and can contain pigments.

The second aqueous plastic material dispersion is applied to the substrate in such an amount that the second, inner layer of the dressing formed of the second aqueous plastic material dispersion is thicker than the first, outer layer of the dressing at least in those locations where depressions are present in the surface of the substrate. The second aqueous plastic material dispersion can have properties such that a second, inner layer of the dressing of a hardness of less than 78 Shore A is formed after applying the second aqueous plastic material dispersion onto the substrate.

The properties of the second aqueous plastic material dispersion can be such that a second, inner layer of the dressing of lower density than the density of the first, outer layer of the dressing is formed after applying the second aqueous plastic material dispersion onto the substrate. The particle size distribution of the plastic material particles contained in the second aqueous plastic material dispersion can be between 0.1 and 30 $\mu m$, and the solids content portion of the second aqueous plastic material dispersion can amount to more than 40 percent by volume.

Solids in the form of hollow microspheres of a diameter of between 0.008 and 0.1 mm and a thin shell of thermoplastics can be provided in at least one of the plastic material dispersions. Solids in the form of compact particles can be provided in at least one of the aqueous plastic material dispersions and can be formed by heating hollow microspheres. Solids in the form of cellulose particles and or leather particles can be provided in at least one of the aqueous plastic material dispersions.

A solvent (e.g. an alcohol) miscible with water can be contained in at least one of the aqueous plastic material dispersions in addition to water.

A plate made of metal can be used as the carrier means or a roll made of metal in conjunction with a flexible supporting base can be used as the carrier means. The carrier means can be inseparably connected with the supporting base.

The substrate provided with the second aqueous plastic material dispersion can be caused to pass over at least one roll and turned during this passing prior to placing it onto the presolidified, first aqueous plastic material dispersion disposed on the upper side of the supporting base and forming the first, outer layer.

Alternatively, the substrate prior to applying the second aqueous plastic material dispersion, can be placed onto a carrier with that side facing away from the surface to be provided with the dressing, and then turned together with said carrier and placed onto the presolidified first aqueous plastic material dispersion located on the supporting base with that surface onto which the second aqueous plastic material dispersion was applied.

The carrier can be made of paper, textile material or a web of plastic material. Pressure can be exerted by elastic pressure means during the solidification of the second aqueous, polyurethane-containing plastic material dispersion onto that side of the substrate disposed on the supporting base which faces away from the side to be provided with the dressing.

Alternatively, pressure is exerted by flexible pressure means during the solidification of the second aqueous, polyurethane-containing plastic material dispersion onto that side of the substrate disposed on the supporting base which faces away from the side to be provided with the dressing.

The vapor generated during the solidification of the second aqueous plastic material dispersion can be drawn off by vacuum.

The supporting base can be advanced in cycles at least between the individual process steps.

The surface of the first, outer layer of the dressing can be provided with a finish of a transparent liquid plastic material of a thickness of less than 0.09 mm, the transparent liquid plastic material containing polyurethane. The transparent liquid plastic material can be pressed or sprayed onto the first, outer layer. The carrier means for the supporting base can consist of at least two ropes, bars, or belts arranged at a distance from one another. The spray generated during the spraying of the first aqueous plastic material dispersion onto the upper side of the supporting base can be drawn off together with the vapor generated during the solidification of the first aqueous plastic material dispersion.

SPECIFIC DESCRIPTION

Figure 1:
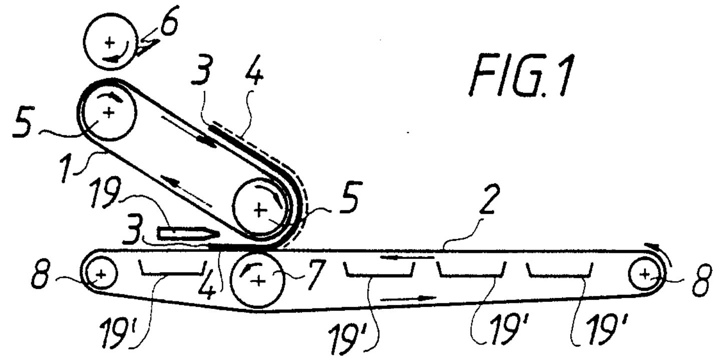
FIG. 1 shows a side elevation of a first embodiment of a part of the apparatus according to the invention.

The part shown in FIG. 1 of the apparatus according to the invention has a supporting means 1 for the leatherlike layer to be dressed, which is formed of a split leather or nonwoven needled fleece of natural or synthetic fibers 3. The supporting means is formed of an endless driven belt passed over two rolls 5. The split leather or nonwoven needled fleece of natural or synthetic fibers 3 is placed onto the belt 1 and the dressing 4 consisting of an aqueous dispersion of synthetic plastics material is uniformly applied by means of a coating roll 6 while the split leather or nonwoven needled fleece of natural or synthetic fibers is passed by below the coating roll 6. The coating roll 6 rotates, as is indicated by arrows, in opposite direction to the direction of movement of the belt forming the supporting means 1.

This makes sure that, by making use of the shearing forces, the fibers protruding from the split leather or nonwoven needled fleece of natural or synthetic fibers 3 are completely embedded within the aqueous dispersion of synthetic resin material applied in a single operating step and are thus inseparably bonded to this layer after solidification of this aqueous dispersion of synthetic resin material.

In place of the coating roll 6 rotating in opposite sense, also a pouring device can be used, via which the dressing 4 consisting of an aqueous dispersion of synthetic resin material is applied onto the split leather or nonwoven needled fleece of natural or synthetic fibers 3 while this is moving along. In this case, the supporting means 1 does not consist of an endless driven belt but of endless ropes passed over both rolls 5, which provides the possibility that any excess of the aqueous dispersion of synthetic plastics material can flow off.

There is conveniently used a liquid solution of a synthetic plastics material or an aqueous dispersion of synthetic plastics material containing more than 40 percent by volume of solid matter. It is of advantage if there is used a cross linking dispersion of polyurethane and/or polybutadiene which is substantially not thermoplastic.

The lower roll 5 forms a deflection area of the belt 1, at which the split leather or nonwoven needled fleece of natural or synthetic fibers provided with the liquid dressing is lifted off the belt 1 and is placed on a supporting base 2 formed of a conveyor belt such that that side of the split leather or nonwoven needled fleece of natural or synthetic fibers 3 rests on this conveyor belt 2 which has been provided with the liquid dressing 4. The conveyor belt 2 is moved with the same speed as the belt 1 so that transferring the split leather or nonwoven needled fleece of natural or synthetic fibers 3 onto the conveyor belt 2 takes place.

A counter roll 7 supporting the conveyor belt 2 is provided below the lower roll 5 for preventing sagging of the conveyor belt 2 within the transfer area. This conveyor belt 2 is passed over rolls 8.

Peeling of the split leather or nonwoven needled fleece of natural or synthetic fibers 3 provided with the dressing 4 from the conveyor belt 1 and transfer of this split leather or nonwoven needled fleece of natural or synthetic fibers onto the conveyor belt 2 can be facilitated if a pressurized air nozzle 19 is arranged at the transfer area and the pressurized air flowing out of this nozzle is directed against the split leather or nonwoven needled fleece of natural or synthetic fibers 3 and loosens it from the belt 1.

The conveyor belt 2 preferably consists of silicone rubber, noting that the top surface of the conveyor belt 2 has a negative grain structure, so that the dressing solidifying on the conveyor belt 2 is provided with a grain structure and thus has an appearance similar to that of leather. For accelerating film formation of the dressing, the conveyor belt 2 is heated by heating means, for example by infrared radiators 19'. Heating can, however, also be effected, for example, by means of a gas-fired radiator. Such heating reliably provides for a more rapid removal of the water or solvent, respectively.

Figure 2:
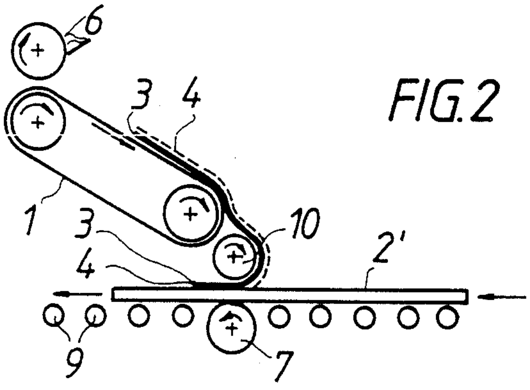
FIG. 2 shows a side elevation of a second embodiment of a part of the apparatus according to the invention.

The embodiment according to FIG. 2 differs from the embodiment according to FIG. 1 by the fact that, in place of the conveyor belt 2, a supporting base 2' is provided which is formed of a platelike carrier body and is moved in forward direction over transport rollers 9. The platelike carrier body preferably consists of silicone rubber and is provided with a reinforcing insert formed of a fleece or fabric of glass fibers, asbestos fibers or carbon fibers. These materials have the advantage of a low weight and of nearly no heat expansion and of being resistant, like the silicone itself, to the existing temperatures.

The reinforcing insert can be embedded within the supporting layer 2', but can also be provided at the lower side of the supporting base.

The supporting base 2' can also be constructed of two layers, the upper layer showing the surface structure being softer and more elastic, respectively, than the lower layer.

Furthermore, a transfer roll 10 is provided at the transfer area for transferring the split leather or nonwoven needled fleece of natural or synthetic fibers 3 provided with the dressing 4 to the platelike carrier body 2'. Also this platelike carrier body 2' is heated by heating means 19', for example infrared radiators.

The use of a platelike carrier body 2' as the supporting base has the advantage that the dressed leatherlike product can, together with the carrier body 2', be transported away for further processing as will be explained later in detail.

In place of the transfer roll 1 there can also be provided a transfer belt by means of which the orientation of the split leather or nonwoven needled fleece of natural or synthetic fibers can be changed during transfer onto the platelike carrier body 2'.

The platelike carrier body 2' itself can have a negative leather grain structure, so that the dressing solidifying on this carrier body is given a grain structure on its surface, but it is also possible to place onto the platelike carrier body a paper sheet coated with synthetic resin material and having a structured surface and causing the formation of a structured surface of the dressing. Of course, a paper sheet having such a structured surface can also be placed onto the conveyor belt 2 (FIG. 1), now having no negative leather grain structure, for forming the leather grain structure of the dressing, said paper sheet consisting, for example, of an endless paper band to be drawn off a storage roll.

Figure 3:
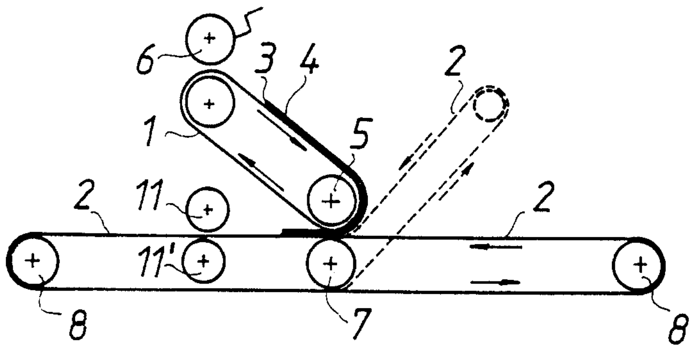
FIG. 3 shows a modified embodiment according to FIG. 1.

In the embodiment according to FIG. 3, there are provided pressing rolls or, respectively, compressing rolls 11, 11' by means of which the split leather or nonwoven needled fleece of natural or synthetic fibers 3 provided with the dressing 4 in the solidifying stage is pressed against the top surface, itself provided with the grain structure, of the conveyor belt 2. From FIG. 3 can further be derived that the conveyor belt 2 need not extend within a plane over its whole length, but can be deflected for a certain angle at the area of the counter roll 7 as this is shown in FIG. 3 by dashed lines. Such an arrangement facilitates transfer of the split leather or nonwoven needled fleece of natural or synthetic fibers 3 provided with the dressing 4 from the belt 1 onto the conveyor belt 2.

Also in the embodiments according to the FIGS. 2 and 3 pressurized air nozzles 19 can be provided for loosening the split leather or nonwoven needled fleece of natural or synthetic fibers.

Figure 4:
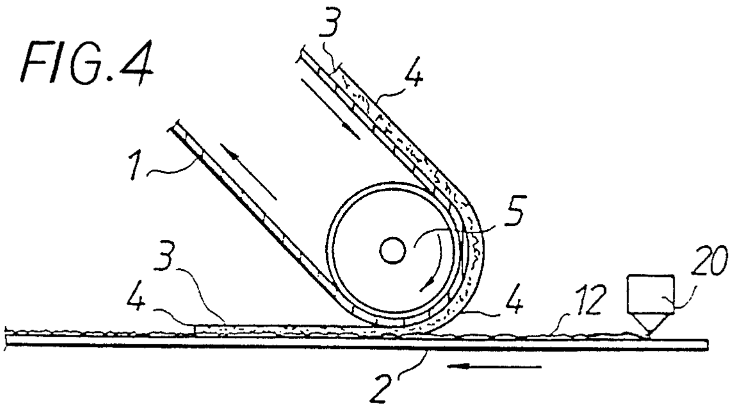
FIG. 4 shows a detail of the embodiment according to FIG. 3 in an enlarged scale.

FIG. 4 shows the application of a layer 12 onto the conveyor belt 2, which is necessary for a dressing comprising two layers. Of course, such a layer can also be applied onto a platelike carrier body 2' forming the supporting base or, respectively, onto the paper sheet. Forming the dressing of two layers, of which the inner layer located adjacent the split leather or nonwoven needled fleece of natural or synthetic fibers 3 is preferably of greater thickness than the outer layer having the structured surface, provides the advantage that the dressing has better abrasion resistance than a dressing formed of one single layer.

Application of an aqueous dispersion or liquid solution of synthetic resin material forming the layer onto the conveyor belt 2 or, respectively, onto the carrier body 2' is effected, for example, by pouring or spraying a thin layer by means of a suitable device 20 onto the supporting base 2 or 2', respectively, heated to a temperature of more than 70° C. Thereby, micropores are formed in the desired manner, because solidification of the poured or sprayed dispersion already starts on impingement onto the heated supporting base.

If the supporting base consists of a paper sheet provided with a structured surface, it is of advantage to apply the aqueous dispersion or, respectively, the liquid solution of synthetic resin material onto the paper sheet by means of a wiper.

Conveniently, the aqueous dispersion of synthetic plastics material applied onto the supporting base by pouring or spraying and forming the outer layer has a lower viscosity and the liquid solution of synthetic plastics material applied to the supporting base by wiping has a higher viscosity than the dispersion applied onto the leather or nonwoven needled fleece of natural or synthetic fibers 3 and forming the inner layer 4 embedding the fibers.

Placing of the split leather or nonwoven needled fleece of natural or synthetic fibers 3 provided with the still wet layer onto the supporting base 2 or 2' is only effected if the layer 12 has already become solidified at least to a substantial degree. For fulfilling this condition, the application device 20 for applying the layer onto the supporting base 2 or, respectively, 2' is located at a distance from the transfer area for transferring the leather or nonwoven needled fleece of natural or synthetic fibers 3 from the conveyor belt 1 to the supporting base 2 or, respectively, 2' at one side of this transfer area.

The speed of the belt 1 and of the supporting base 2 or, respectively, 2' is conveniently infinitely variable to be in the position to adapt this speed to the existing requirements. The preferred speed for advancing the split leather or nonwoven needled fleece of natural or synthetic fibers 3 is between 3 and 8 m/min.

The described construction of the apparatus provides, in particular, the advantage that adhesion of the dressing compound 4 on the leather or nonwoven needled fleece of natural or synthetic fibers 3 is improved on account of directly or, respectively, immediately applying onto the leather or nonwoven needled fleece of natural or synthetic fibers 3 the dressing in the liquid phase, so that the fibers protruding from the leather or nonwoven needled fleece of natural or synthetic fibers are embedded within the dressing and the dressing is inseparably bonded to the leather. Because no manual turning over of the leather provided with the wet dressing is necessary, the finished dressing has no disturbing defects which result from grasping the leather or nonwoven needled fleece of natural or synthetic fibers provided with the dressing still wet or from subsequent shifting the leather or nonwoven needled fleece of natural or synthetic fibers which has already been turned over and placed on the support. By using this apparatus, the time interval passing between application of the liquid dressing and placing the leather or nonwoven needled fleece of natural or synthetic fibers provided with the liquid dressing is reduced and can, above all, exactly be predetermined. Thus, the supporting base 2 or 2', respectively, can more intensely be heated and drying of the dressing takes place within a shorter time. Furthermore, it is possible to apply the dressing compound onto the leather as a layer of smaller thickness, because of the very short time interval passing between applying the liquid dressing and turning over the leather or nonwoven needled fleece of natural or synthetic fibers and placing same onto the supporting base 2 or 2', it is ensured that substantially no liquid will evaporate or migrate into the leather.

The use of the apparatus further provides the possibility to firmly and inseparably bond to the split leather or nonwoven needled fleece of natural or synthetic fibers 3 also porous, air permeable and steam-permeable dressings having a density of less than 0.8 and is particularly suitable for the production of shoe uppers to be provided with a polyurethane sole by foaming same onto the upper, because the shoe upper consisting of the inventive split leather or nonwoven needled fleece of natural or synthetic fibers allows, when being inserted into the mold required for forming the polyurethane sole, escape of the air during forming operation because of its porosity. Furthermore, the polyurethane sole is excellently mechanically anchored to the shoe upper during the foaming operation, because the polyurethane penetrates into the porous dressing, so that an excellent bond between the dressed split leather or nonwoven needled fleece of natural or synthetic fibers and the polyurethane sole is reliably obtained.

To provide for ease of cleaning of the component parts of the apparatus, all components coming into contact with the liquid solution or the aqueous dispersion of synthetic resin material, for example the rolls 10 and 11 are provided with a coating of a silicone varnish or of silicone rubber.

Figure 7:
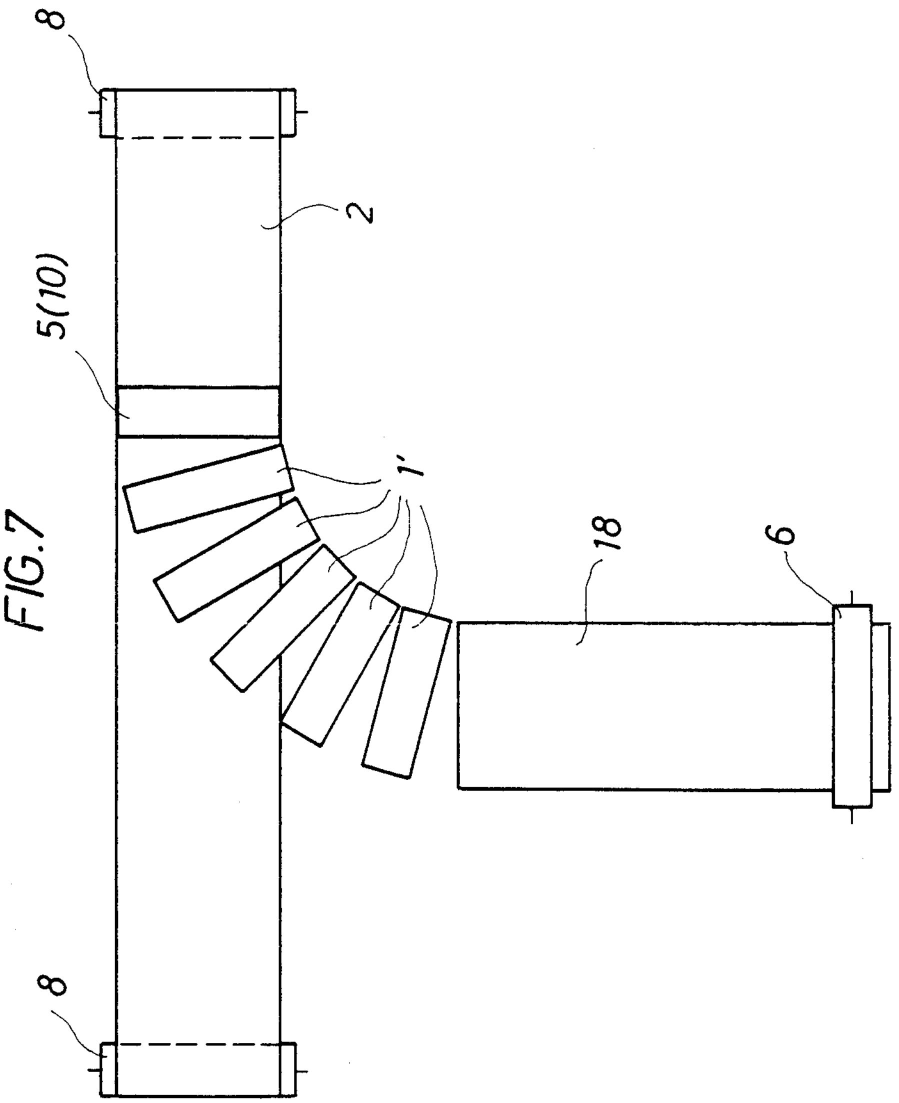
FIG. 7 shows in a top plan view a third embodiment of a part of the apparatus according to the invention.

FIG. 7 shows an apparatus according to the invention in a top plan view, according to which the supporting means consists of an arcuate deflecting device formed of a plurality of transport rolls 1'. In this apparatus there is used a known device for applying the dressing in the liquid phase to the split leather or nonwoven needled fleece of natural or synthetic fibers, said device consisting of a conveyor belt 18, on which the split leather or nonwoven needled fleece of natural or synthetic fibers is advanced, noting that the dressing is uniformly applied onto the split leather or nonwoven needled fleece of natural or synthetic fibers via the application roll 6. At the end of the conveyor belt 18, which is located opposite the application roll 6, there are arranged the transport rolls 1', being at least in part driven and being arranged such that the split leather or nonwoven needled fleece of natural or synthetic fibers 3 is deflected through approximately 90° by these transport rolls 1' receiving the split leather or nonwoven needled fleece of natural or synthetic fibers from the conveyor belt 18. The last of said transport rolls 1' forms the deflection area 5 at which the split leather or nonwoven needled fleece of natural or synthetic fibers having applied thereon the liquid dressing 4 is placed on the supporting base formed of a conveyor belt 2 such that that side of the split leather or nonwoven needled fleece of natural or synthetic fibers rests on this conveyor belt 2 which has been provided with the liquid dressing 4. Of course, also in this embodiment there can be provided, in place of the conveyor belt 2, a supporting base 2' formed of a platelike carrier body and being advanced via transport rolls in an analogous manner as in the embodiment according to FIG. 2. In any case, the deflecting device has the effect that the transport belt 2 or, respectively, the supporting base 2' advanced via the transport rolls can be arranged at a position in which the device for applying the dressing to the split leather or nonwoven needled fleece of natural or synthetic fibers forms no obstacle.

Figure 8:
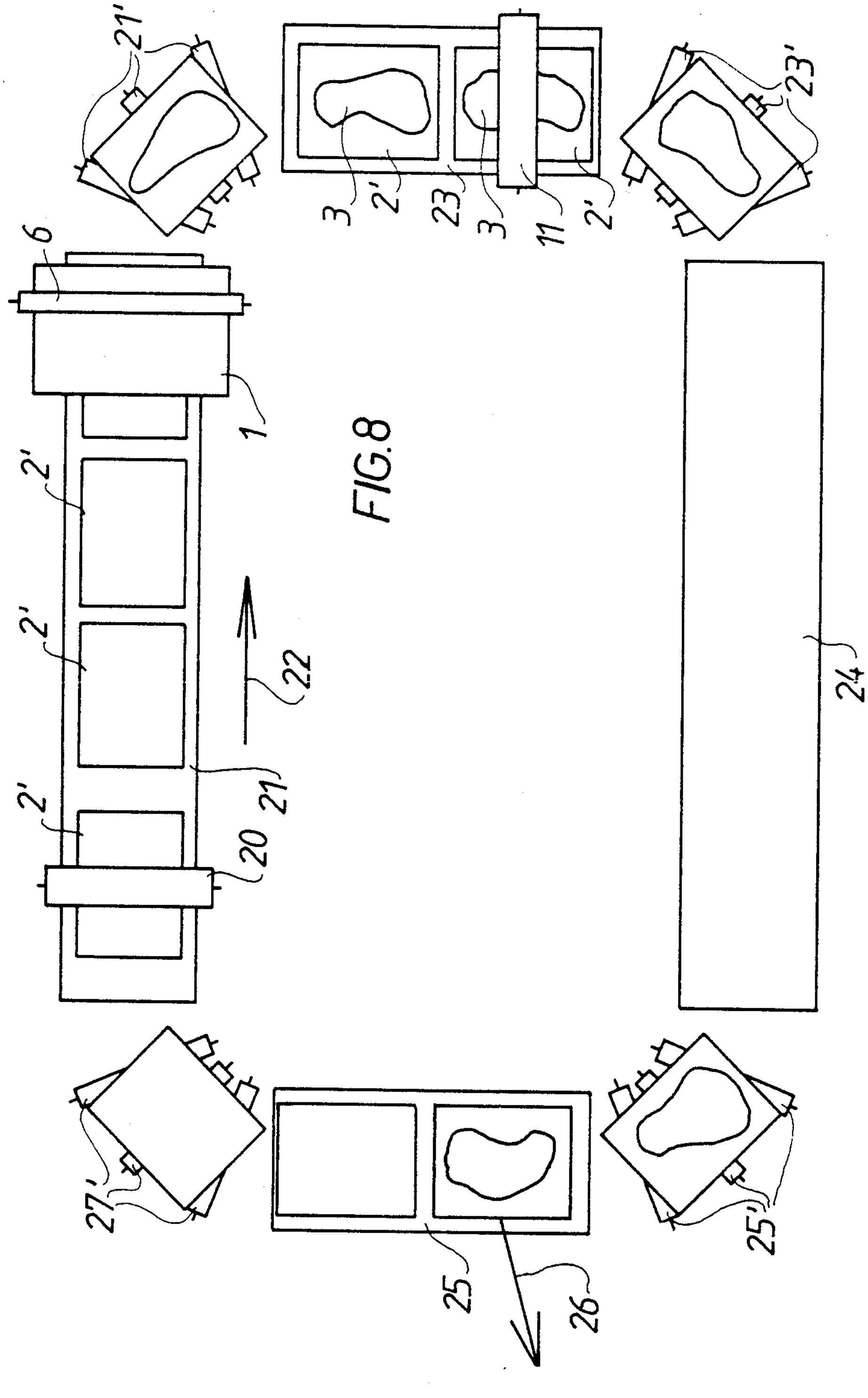
FIG. 8 schematically shows in a top plan view an inventive apparatus allowing working according to conveyor-line process.

FIG. 8 schematically shows the continuous sequence of working steps in dressing a split leather or nonwoven needled fleece of natural or synthetic fibers. The supporting bases 2' of silicone rubber are advanced in direction of the arrow 22 on a conveyor belt 21 replacing the transport rolls 9 in FIG. 2. The top surface of the supporting bases 2' is a structured surface. An aqueous dispersion or a liquid solution of synthetic resin material is poured or sprayed onto this top surface and is allowed to solidify during further advancement, solidification being accelerated by heating means (not shown) heating the supporting bases 2'.

At a distance from the device 20, there is located the transport band 1, on which the split leather or nonwoven needled fleece of natural or synthetic fibers 3 is resting. An aqueous dispersion of synthetic resin material is applied onto the split leather or nonwoven needled fleece of natural or synthetic fibers in the described manner via the application roll 6 and subsequently the split leather or nonwoven needled fleece of natural or synthetic fibers is, with its wet side facing downward, placed upon a supporting base 2' provided, as explained above, with an already solidified layer.

The thus split leather or nonwoven needled fleece of natural or synthetic fibers is deflected via transport rollers 21' and arrives on a further conveyor belt 23, where the dressed split leather or nonwoven needled fleece of natural or synthetic fibers is pressed against the supporting base 2' by means of press rolls 11. After a further deflection via transport rolls 23', the dressed split leather or nonwoven needled fleece of natural or synthetic fibers enters a vacuum device 24 to be later described in detail and moves from there via transport rolls 25' onto the conveyor belt 25 where at 26 the finished split leather or nonwoven needled fleece of natural or synthetic fibers 3 now provided with a dressing is removed. The supporting bases 2' are further advanced and return again onto the conveyor belt 21 via transport rolls 27'.

Figure 10:
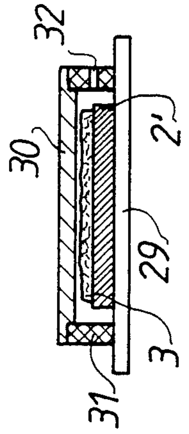
FIG. 10 shows a section along the line X—X in FIG. 9.
Figure 9:
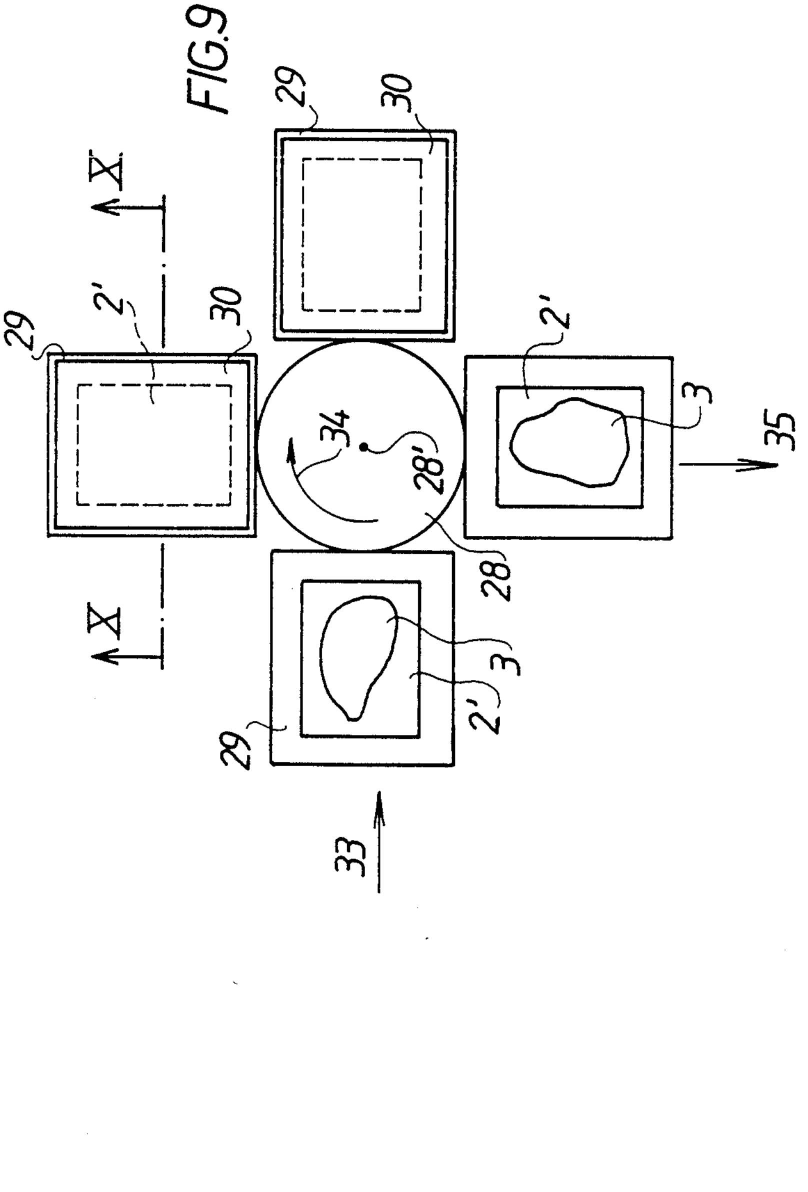
FIG. 9 shows in a top plan view a first embodiment of a vacuum device forming part of the apparatus according to the invention.

FIGS. 9 and 10 show a first embodiment of a vacuum device. Tables 29 forming a carrier body for the supporting base 2' are fixed on a rotatable carrier member 28 which is rotatable around an axis 28'. At the location 33, a table 29 is charged with a supporting base 2' carrying a dressed split leather or nonwoven needled fleece of natural or synthetic fibers. Subsequently the tables 29 are moved in direction of the arrow 34. At the following location, there is placed onto the table 29 a diaphragm 30, which can be rectangular, in particular of square shape, but can also be of round, in particular circular, shape and which has at its edge a packing strip 31 extending around the circumference and having its free end, which is preferably provided with a profile, resting on the table 29. The diaphragm 30 provided with the packing strips 31 thus encloses the supporting base 2' together with the split leather or nonwoven needled fleece of natural or synthetic fibers 3.

An opening 32 arranged at a location of the packing strips and provided with a valve can be connected with a vacuum source (not shown), so that, after having connected this vacuum source, a reduced pressure is generated within the space enclosed by the diaphragm 30 and the packing strip 31 and provokes that the diaphragm 30 engages the split leather or nonwoven needled fleece of natural or synthetic fibers 3 and presses this split leather or nonwoven needled fleece of natural or synthetic fibers against the supporting base 2'. Simultaneously the vapors generated on drying the dressing are sucked off.

The diaphragm 30 as well as the packing strip 31 consist of an elastomeric material, the packing strip 31 being preferably formed of a softer material than the diaphragm 30. The elastomeric material in question is preferably caoutchouc or rubber, in particular a silicone rubber.

If the valve of the opening 32 is closed, the reduced pressure is maintained even when interrupting the connection with the vacuum source. Subsequently, the table 29 is, together with the supporting base 2' and the diaphragm 30, pressed against the split leather or nonwoven needled fleece of natural or synthetic fibers 3, brought into the position shown at the right hand of FIG. 9 and finally arrives at the discharge location 35 where the valve of the opening 32 is opened, so that the space enclosed by the diaphragm 30 and the packing strips 31 is connected with the atmosphere. On account of the restoring force intrinsic for the material of the diaphragm, the diaphragm 30 again returns in its starting position and can be lifted off, whereupon the dressed split leather or nonwoven needled fleece of natural or synthetic fibers are removed together with the supporting base 2'.

Figure 11:
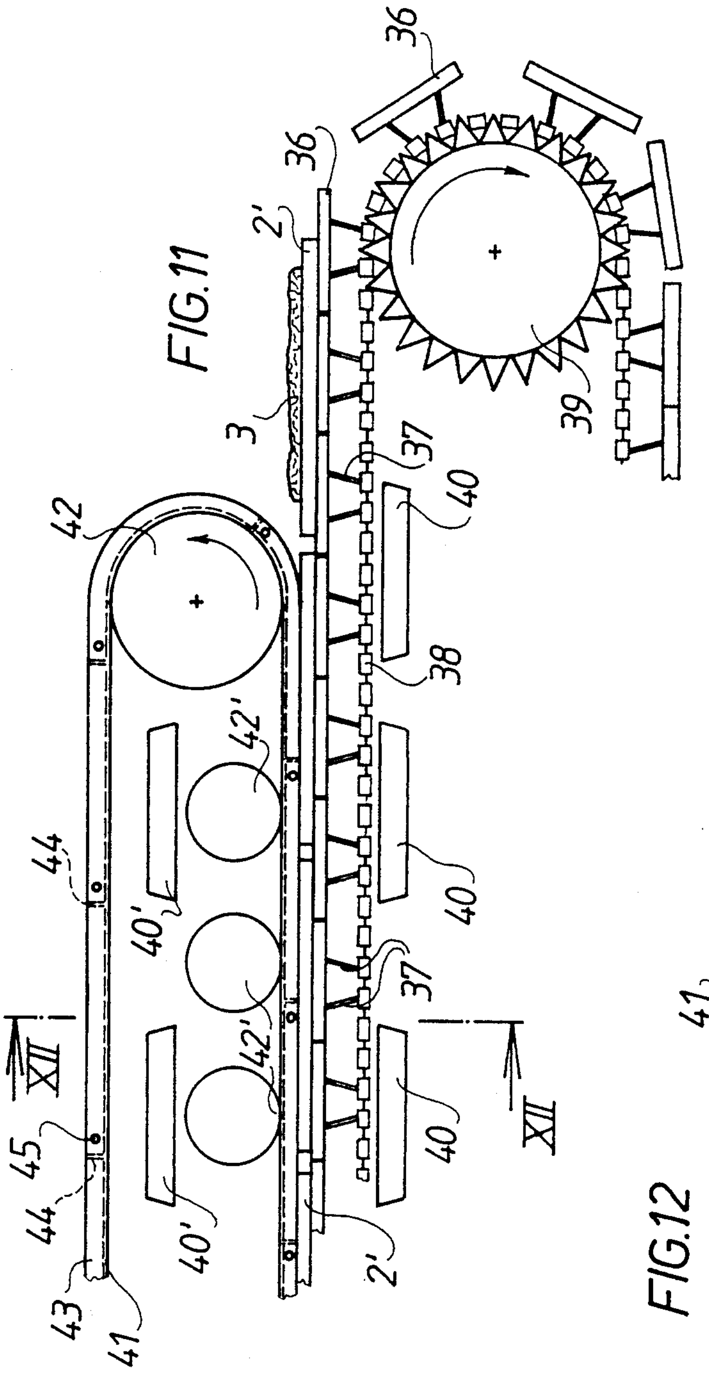
FIG. 11 shows a side elevation of a second embodiment of the vacuum device.
Figure 12:
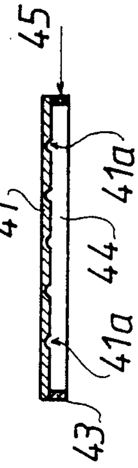
FIG. 12 shows a section along the line XII—XII in FIG. 11.

In the embodiment according to the FIGS. 11 and 12 there is provided a carrier body consisting of plate members connected via protruding extensions 37 with conveyor chains 38 passed over sprocket wheels 39. In place of the plate members, also lamellae or tubular carrier bodies may be provided.

The supporting bases 2' carrying the split leather or nonwoven needled fleece of natural or synthetic fibers 3 provided with the dressing rest on the plate member 36. The supporting bases 2' are conveniently arranged such that they each cover one gap between two adjacent plate members 36.

Below the plate members 36, there are located heating means, for example infrared radiators 40, by means of which the plate members 36 and therewith also the base members 2' are heated.

The plate members 36 cooperate with a diaphragm 41 consisting of an endless band spanned over rolls 42. This diaphragm 41 formed of the endless band is designed such that a tight closure between the diaphragm and the supporting bases 2' or the plate member 36 is possible, so that here again a sub-atmospheric pressure can be produced within the interstice. For this purpose, packing strips 43 of an elastomeric material are, in the embodiment shown in FIG. 11, provided at the marginal areas extending in advancing direction of the diaphragm 41, and optionally packing strips 44 transversely extending to the advancing direction are also provided. It has, however, been found that a vacuum can be generated also without providing such packing strips. Within the packing strips or within the diaphragm 41 (if packing strips are omitted) there are again provided openings 45 equipped with a valve and adapted to be connected with a vacuum source. This again results in pressing the diaphragm 41 against the split leather or nonwoven needled fleece of natural or synthetic fibers 3 located on the supporting base 2' as well as in sucking off the vapors generated on drying the dressing.

The endless band forming the diaphragm 41 is shorter in length than the carrier body formed of the plate member 36 and acting like an endless band, so that the finished dressed split leather or nonwoven needled fleece of natural or synthetic fibers 3 can in a simple manner be discharged together with the supporting base 2'.

Sucking off of the vapors is improved if grooves **41*a* are provided at the side of the diaphragm 41 facing the leather or nonwoven needled fleece of natural or synthetic fibers, via which grooves the vapors formed can escape. Of course, such grooves can also be provided in the diaphragm 30 of FIGS. 9 and 10**.

The plate members 36 preferably consist of metal, for example steel. The arrangement of individual plate members in place of an endless steel band results in the advantage that any heat expansion of the plate member is, on account of the resulting subdivision, not disturbing. In particular when using supporting bases 2' of a silicone, the gap between adjacent plate members 36 is sealed by these supporting bases such that this gap does not prevent the generation of a vacuum. The vacuum is, in this case, generated between the supporting base 2' of silicone rubber and the diaphragm 41 and the packing strips 43, 44 (if present), noting that the diaphragm 41 is subdivided into a plurality of chambers by the packing strips 44.

The diaphragm 41 is formed of an endless band conveniently consisting of rubber or caoutchouc and can be reinforced by a metal mesh, a fabric or a fleece. The reinforcement can either be arranged as an insert within the diaphragm or be placed onto the outer side of the diaphragm.

As a rule, the weight of the diaphragm 41 proper is sufficient to establish an initial seal relative to the supporting bases 2', said seal being the premise for the following generation of the vacuum. However, also press rolls 42' can be provided for pressing the diaphragm 41 against the supporting bases 2'. Furthermore, also the diaphragm 41 is conveniently heated by heating means 40', for example infrared radiators, which results in the advantage that any residues of the still liquid solution or still aqueous dispersion of the synthetic resin material adhering to the diaphragm become there solidified and can subsequently easily be removed from the diaphragm.

The packing strips 43, 44 conveniently consist of a softer material than the diaphragm 41 and are glued or vulcanized to the diaphragm 41.

If the plate members 36 are not of metal but consist of a heat resistant synthetic resin material, it is possible to arrange the packing strips on these plate members instead on the diaphragm.

The diaphragm 41 can also be arranged on an endless steel band.

Figure 13:
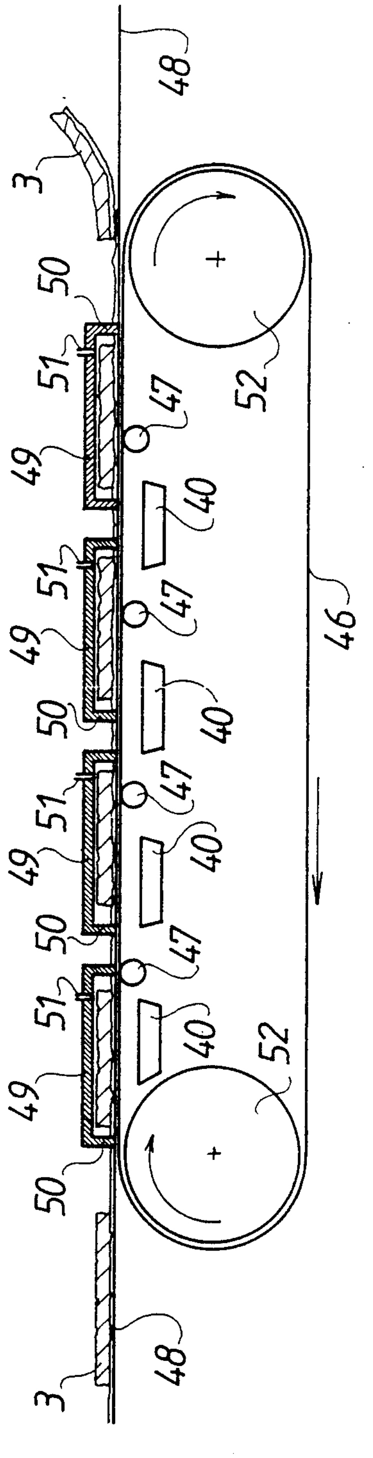
FIG. 13 shows a side elevation of a third embodiment of the vacuum device.

In the embodiment according to FIG. 13, the carrier body consists of an endless band 46 of steel or of an elastomeric, heat-resistant material, said band being supported by supporting rolls 47. Furthermore, heating means 40 are also in this case provided.

The band 46 carries a paper sheet 48 having already applied on its structured top surface a coating formed of an aqueous dispersion or of a liquid solution of synthetic resin material, said coating forming the outer layer of the dressing. This paper sheet 48 replaces the supporting base 2'. Onto this paper sheet 48, there is placed in the described manner the split leather or nonwoven needled fleece of natural or synthetic fibers 3, having thereon the still aqueous dispersion of the synthetic resin plastics material, such that the wet side contacts the paper sheet. A diaphragm 49 comprising packing strips 50 extending around the circumference is placed on each split leather or nonwoven needled fleece of natural or synthetic fibers 3 having been placed onto the paper sheet. Here again, each diaphragm 49 has an opening 51 equipped with a valve and being adapted to be connected to a vacuum source. By applying the vacuum, the diaphragm is again pressed against the split leather or nonwoven needled fleece of natural or synthetic fibers and the vapors are sucked off. The split leather or nonwoven needled fleece of natural or synthetic fibers is, together with the diaphragm, further advanced by the band 46. At the end of this band, the diaphragm is lifted and the dressed split leather or nonwoven needled fleece of natural or synthetic fibers is peeled from the paper sheet 48. The layer having been prefabricated on the paper sheet 48 then forms the outer layer, containing the pigment, of the dressing.

The paper sheet can again be provided with such a layer and can then again be used.

The band 46 is passed over rolls 52.

Also, in this case, grooves 41*a* are conveniently again provided at the side of the diaphragm 49 facing the split leather or nonwoven needled fleece of natural or synthetic fibers for facilitating removal of the vapors.

The operating steps of all described vacuum devices can be controlled to be in conformity with the speed of the preceding device, so that a continuous production is possible.

In all apparatuses, the diaphragms may consist of various products of elastomeric properties such as natural rubber, synthetic rubber, silicone rubber and elastic polyurethane.

Figure 5:
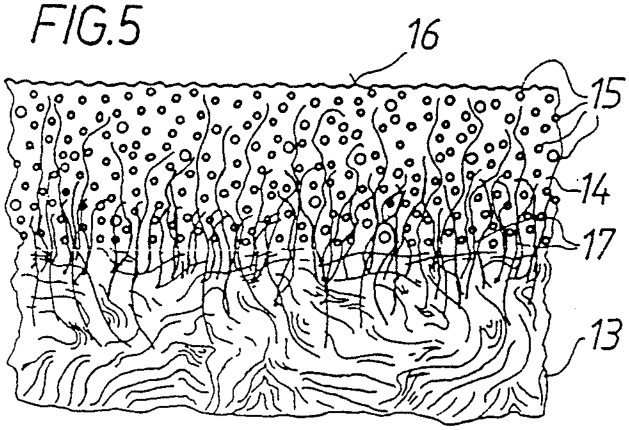
FIG. 5 shows in an enlarged scale a section through a dressed split leather or nonwoven needled fleece of natural or synthetic fibers provided with a dressing consisting of a single layer.
Figure 6:
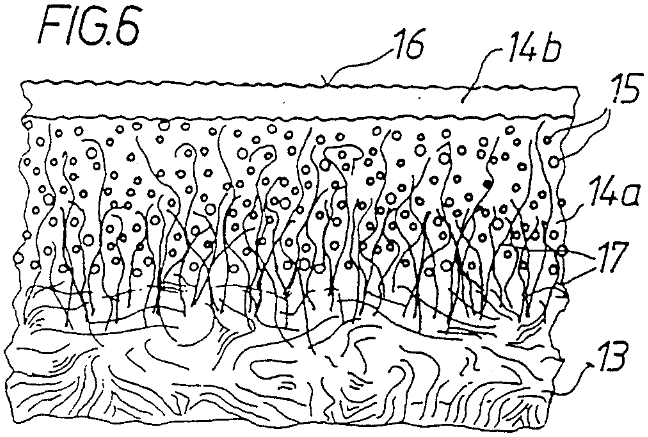
FIG. 6 shows in an enlarged scale a section through an inventive split leather or nonwoven needled fleece of natural or synthetic fibers comprising a dressing formed of two layers.

FIGS. 5 and 6 show a dressed split leather or nonwoven needled fleece of natural or synthetic fibers in an enlarged scale. In the embodiment according to FIG. 5, the split leather or nonwoven needled fleece of natural or synthetic fibers 13 is provided on its one side with a mono-layer dressing 14 having been formed of an aqueous dispersion of synthetic plastics material and having embedded therein hollow microspheres. As can be seen, the fibers completely extend into the dressing 14 at the top surface of the split leather or nonwoven needled fleece of natural or synthetic fibers 13 facing the dressing 14, which results in an intimate bond between the split leather 13 and the dressing 14. The visible side 16 of the dressing 14 is given a structured surface and thus has, for example, an appearance similar to !hat of leather.

In the embodiment according to FIG. 6, the dressing consists of two layers 14*a*, 14*b* the inner layer completely receiving the fibers of the split leather or nonwoven needled fleece of natural or synthetic fibers 13 having embedded therein hollow microspheres 14*a*. This inner layer 14*a* has preferably a neutral color and contains neither pigments nor dyestuffs.

The outer layer 14*b* has a substantially smaller thickness than the inner layer 14*a* and comprises no hollow microspheres but instead contain such an amount of pigments or dyestuffs, that the tinge of the dressing is defined. The top surface 16 of this outer layer 14*b* is again given a structured surface and thus has an appearance similar to that of leather.

If the inner layer 14*a* located adjacent the leather has a neutral tinge relative to the leather and relative to the outer layer 14*b* and if pigments and/or dyestuffs are incorporated only in the outer layer 14*b* for defining the color of the dressing, there results the advantage that, in case a change in color of the dressing shall be effected, only the aqueous dispersion or liquid solution of synthetic resin material forming the outer layer 14*b* must be replaced by another one or, respectively, the application means therefor must be interchanged. In this case it is not necessary to adapt the color of the dispersion of synthetic resin material forming the inner layer 14*a* and having a milky appearance. The neutral color of the inner layer 14*a* makes further sure that any inking of the leather to be provided with the dressing becomes not visible on the top surface of the dressing even if strongly inked leather is used.

It is of particular advantage if the inner layer 14*a* has a pore structure or foam structure, respectively. Such a layer has then the desired permeability for steam or water vapor. This further favors design of this inner layer in a neutral manner with respect to color. The pore structure or foam structure, respectively, can in particular be achieved if hollow microspheres having a diameter of 0.008 to 0.10 mm and having a thin shell of thermoplastic material, preferably of a vinylidenchloride copolymer, are embedded at least into the inner layer. Such hollow microspheres are known per se. Optimum results are obtained if the inner layer comprises more than 8 percent by volume of hollow microspheres.

For optimum results, also the density of the layers is of importance. Conveniently, the inner layer has a density between 0.6 and 0.8 and the outer layer has a density between 0.82 and 1.24.

Furthermore, a reinforcing insert formed, for example, of a textile material or of a fleece material having a weight per unit area of less than 80 g/m$^2$ can be arranged within at least one layer. The permeability of the dressing for water vapor can be increased in the desired manner by this reinforcing insert. Furthermore, such an insert acts like an armoring and prevents excessive elongation and thus destruction of the dressing on tension stress.

If the structured surface of the outer layer should be given a special appearance, an additional thin finish layer, for example a layer influencing the lustre or the color, can be arranged on this surface. This additional layer does, however, not form a necessary component of the dressing which is, as already mentioned, conveniently formed of two layers. The thickness of this additional layer having been applied only at a later stage is thus not to be considered in the thickness of the dressing.

The structured surface of the dressing can, as is desired, have an appearance similar to that of leather or nonwoven needled fleece of natural or synthetic fibers grain or have the appearance of a finely ground leather of fully-grained type, the latter resulting in a pile effect.

The split leather or nonwoven needled fleece of natural or synthetic fibers has, in combination with the dressing, conveniently a permeability for water vapor of more than 0.3 mg/cm$^2$. The permeability for water vapor is measured according to JUP 15, an European Test Specification for determining the permeability of leather for water vapor.

For forming the dressing, an aqueous dispersion of synthetic plastics material is applied, in the wet stage, in an amount between 150 g/m$^2$ and 450 g/m$^2$ and preferably in an amount of approximately 300 g/m$^2$, whereupon the leather is, with its side provided with the dressing facing downward, placed onto a supporting base having a structured surface and finally the leather or nonwoven needled fleece of natural or synthetic fibers with the dispersion of synthetic resin material applied thereon is compressed and subjected to a vacuum treatment. When applying the dispersion of synthetic plastics material in the indicated amount, there is produced a dressing of such a thickness that, on the one hand, a good and inseparable bond with the leather or nonwoven needled fleece of natural or synthetic fibers is obtained and fibers protruding from the leather or nonwoven needled fleece of natural or synthetic fibers are completely embedded in a reliable manner and that, on the other hand, the properties of the leather or nonwoven needled fleece of natural or synthetic fibers are not adversely influenced by the dressing. On account of the leather or nonwoven needled fleece of natural or synthetic fibers being placed on the supporting base having the structured surface with its side carrying the dressing facing downwardly, the structure in the dressing is produced immediately on solidification of the dressing, so that no separate operating step is required therefor, noting that a bubble-free solidification of the dressing with simultaneous formation of the structured surface is assisted by the pressing step and by the vacuum treatment.

For imparting to the layer located adjacent the leather or nonwoven needled fleece of natural or synthetic fibers and completely receiving the fibers protruding from the leather or nonwoven needled fleece of natural or synthetic fibers the desired foam structure, there are conveniently incorporated into the aqueous dispersion of synthetic resin material and prior to applying same hollow microspheres having a diameter of 0.008 to 0.1 mm, the thin shell of these microspheres consisting of thermoplastic material, preferably of a vinylidenechloride copolymer.

If the dressing is formed of two layers, a further aqueous dispersion of synthetic resin material or a further liquid solution of synthetic plastics material is applied onto the structured surface of the supporting base prior to placing the leather or nonwoven needled fleece of natural or synthetic fibers having thereon an aqueous dispersion of synthetic plastics material onto said supporting base, noting that the leather or nonwoven needled fleece of natural or synthetic fibers is placed onto the supporting base only after solidification of said further aqueous dispersion or, respectively, liquid solution of synthetic resin material. This further aqueous dispersion or, respectively, liquid solution of synthetic plastics material may then, for example directly form a finish.

EXAMPLE

A supporting base of a thickness of about 2 mm having a textured surface of silicon caoutchouc and provided with a reinforcement consisting of an embedded metal net has an underside provided with an aluminum plate of a thickness of about 3 mm. The base is supported by this aluminum plate on a carrier plate made of metal heated over heating means so that a heating of the silicon caoutchouc surface of the supporting base is achieved by the contact of the carrier plate via the aluminum plate. The density of the supporting base together with the embedded metal net amounts to approximately 1,3 g/cm$^3$. By the aforementioned thickness of the supporting base of about 2 mm in conjunction with the aforementioned density, the required heat capacity and thermal conductivity of the supporting base are assured so that on the one hand, the heat of the supporting base is quickly transferred to the upper side of the supporting base, while on the other hand, a fast temperature drop during the heat transfer is prevented. At a temperature of the carrier plate of about 110° C. and an initial temperature of the supporting base of about 35° C., the surface of the supporting base is heated to the desired temperature of about 75° C. in less than 45 seconds. The aluminum plate can rest on a plurality of specially arranged wires, ropes, bars or belts instead of being supported by the carrier plate. The heating means, for instance gas radiators or infrared emitters, can be provided between these wires, ropes, bars or belts and heat the aluminum plate directly, whereby the wires, ropes, bars or belts are heated simultaneously.

Once the surface of the supporting base has reached this temperature, the supporting base advances in a spraying booth underneath at least one spraying pistol by means of which about 55 g/m$^2$ of a thin-flowing, cross-linkable, pigment-containing, polyurethane-containing aqueous plastics material dispersion with a solids content of about 31 percent by volume and a viscosity of less than 28 seconds flow time measured in a Ford cup with a nozzle of 4 mm diameter according to DIN 53211 is sprayed onto the surface of the heated supporting base. It is also possible to spray an aqueous synthetic plastics material dispersion containing polyacrylate or polybutadiene onto the surface of the heated supporting base. Particularly favourable results are obtained if an aqueous dispersion is used which contains a mixture of polyurethane and polyacrylate or a mixture of polyurethane and polybutadiene. On impinging of the sprayed-on aqueous plastics material dispersion onto the surface of the heated supporting base, a considerable portion of the water contained in the plastics material dispersion is already evaporated, whereby a pre-solidification of the plastics material dispersion takes place and a film is formed on this surface before the hydrophobic properties of the silicon caoutchouc come to the form to prevent the forming of the film. The spray generated during spraying and the vapor generated during the solidification of the aqueous plastics material dispersion are removed via a suction device arranged in the spraying booth. The polyurethane-containing aqueous dispersion applied by means of this spraying pistol would alone form a hardness of more than 90 Shore A after cross-linking.

The supporting base supplied with further heat is now made to pass, together with the pre-solidified dispersion, underneath at lest one further spraying piston by means of which 115 g/m$^2$ of an equally cross-linkable polyurethane and a pigment containing aqueous plastics material dispersion of a solids content of 38 percent by volume and a viscosity of less than 60 seconds flow time measured in a Ford cup of a nozzle of 4 mm diameter are sprayed onto the already pre-solidified plastics material dispersion. This plastics material dispersion alone would form a film of a hardness of less than 80 Shore A after cross-linking. Also in this connection a synthetic plastics material dispersion containing polyacrylate or polybutadiene can be used and particularly favourable results are obtained if a dispersion is used which contains a mixture of polyurethane and polyacrylate or a mixture of polyurethane and polybutadiene.

As a result of its good thermal conductivity and high heat capacity, the heated supporting base transfers heat through the already pre-solidified portion of the first application of the aqueous plastics material dispersion to the sprayed-on second portion and thus effects the solidification and drying by evaporation of the water contained in said plastics material dispersion which is initiated immediately after spraying it on.

The plastics material dispersions successively applied in the two separate operations together form the first, outer layer of the dressing of a hardness of about 85 Shore A, a thickness of about 0.1 mm and a density of about 1.1 g/cm$^3$ after solidification.

After passing through the spraying device, further heat is applied to the supporting base with the first layer disposed thereon, so that further pre-solidification takes place.

A split of a thickness of about 1.3 mm is ground on its surface to be provided with the dressing and cleaned of dust. Then the side of the leather or nonwoven needled fleece of natural or synthetic fibers opposed to this surface is placed onto a carrier and made to pass by means of this carrier with a speed of about 5.5 m/min. under a rotating applicator roll made of metal for the purpose of applying a second aqueous plastics material dispersion. Before applying this second aqueous plastics material dispersion air may be introduced in this dispersion, for example by blowing in or by working in or whipping in, whereby the second, inner layer formed by this second aqueous plastics material dispersion becomes porous and therefore shows the desired vapor permeability. The applicator roll is provided with a textured surface to this end. The rotating motion of the applicator roll is opposed to the linear motion of the carrier supporting the leather or nonwoven needled fleece of natural or synthetic fibers. This carrier moves with a speed of about 5.5 m/min. and the peripheral speed of the applicator roll is about 7 m/min.

The applicator roll provided with a surface texture is used to apply about 150 g/m$^2$ of a thick-flowing, highly viscous, cross-linkable aqueous plastics material dispersion containing polyurethane and hollow microspheres onto the leather or nonwoven needled fleece of natural or synthetic fibers. The plastics material dispersion has a solids content of about 55 percent by volume, about 7 percent by volume of hollow microspheres being included in this amount. This aqueous plastics material dispersion is of such high viscosity that it can no longer pass the nozzle of a Ford cup with a diameter of 4 mm.

The aqueous plastics material dispersion applied by the rotating applicator roll may also contain polyacrylate or polybutadiene. Suitably, this plastics material dispersion contains a mixture of polyurethane and polyacrylate or a mixture of polyurethane and polybutadiene.

By the relative movement between the leather or nonwoven needled fleece of natural or synthetic fibers advancing on the carrier and the rotating applicator roll abutting the leather or nonwoven needled fleece of natural or synthetic fibers with slight pressure, the highly viscous plastics material dispersion is massaged into the surface of the leather or nonwoven needled fleece of natural or synthetic fibers provided with depressions without essentially being taken up by the leather or nonwoven needled fleece of natural or synthetic fibers.

Applying the second aqueous plastics material dispersion may also be done in two steps by means of two rotating applicator rolls whereby a particularly favourable massaging into the surface of the leather or nonwoven needled fleece is achieved.

Before applying the second aqueous plastics material dispersion by means of the rotating applicator roll onto the leather or nonwoven needled fleece, a textile material having a weight of less than 100 g/m$^2$ may be laid onto the surface of the leather or nonwoven needled fleece and may be fixed to this surface. After solidifying the second aqueous plastics material dispersion this textile material is embedded into the second, inner layer and prevents when the dressed substrate is stretched, the coarse surface structure thereof from being marked or copied on the surface of the dressing as this may be the case when using coarse-fibered split leather and when using pigskin. A further advantage achieved by embedding this textile material consists in that stretching the dressed substrate in total is reduced and the breaking strength is improved.

The leather or nonwoven needled fleece of natural or synthetic fibers is subsequently turned and placed onto the first layer of the dressing disposed on the supporting base with the surface onto which the aqueous plastics material dispersion was applied. The aqueous plastics material dispersion applied to the leather or nonwoven needled fleece of natural or synthetic fibers is now still in the wet state. The first, outer layer of the dressing disposed on the supporting base is now solidified to such an extent that there is no hazard of damaging this first layer by placing the leather or nonwoven needled fleece of natural or synthetic fibers and the wet plastics material dispersion applied thereon under slight pressure of the leather or nonwoven needled fleece of natural or synthetic fibers.

Further heat is subsequently supplied to the supporting base via the carrier plate made of metal onto which the supporting base is supported, so that the supporting base is again heated to about 75° C. This causes the aqueous plastics material dispersion applied to the leather or nonwoven needled fleece of natural or synthetic fibers to solidify, the vapor generated essentially being discharged through the leather or nonwoven needled fleece of natural or synthetic fibers. In this type of operation, the leather or nonwoven needled fleece of natural or synthetic fibers is subject to no or only low thermal stress and thus retains in suppleness and permeability for humidity.

On solidification of the second aqueous plastics material dispersion applied to the leather or nonwoven needled fleece of natural or synthetic fibers, a second layer of the dressing is formed which fills up the depressions on the surface of the leather or nonwoven needled fleece of natural or synthetic fibers completely or nearly completely, has a microporous structure, a lower density than the first layer of the dressing, for instance a density of less than 0.9 g/cm$^3$, and a hardness of less than 78 Shore A.

After about 45 seconds, the second layer is solidified to such an extent that the dressed leather or nonwoven needled fleece of natural or synthetic fibers can be taken off the supporting base.

Subsequently, the surface of the first outer layer of the dressing provided with the texture of leather grain can be provided with a transparent polyurethane finish pressed or sprayed onto this surface directly as a solution or dispersion in an amount of between 8 and 62 g/m$^2$ net weight.

The dressing formed by the first, outer layer and by the second inner layer has a thickness of less than 0.14 mm, the vapor permeability of the dressed leather or nonwoven needled fleece amounts to more than 0.4 mg/cm$^2$h, measured according to IUP 15.

The density of the supporting base as well as of the individual layers of the dressing is conveniently determined by the so-called dipping and weighing method. In this, a liquid whose density was adjusted to a predetermined value is placed into a container. In this method, water whose density was adjusted by the addition of salt, for instance, to a value of 1.05 g/cm$^3$ is conveniently used. The sample body is immersed into this water. If the sample body sinks within 30 seconds, its density is greater than the adjusted value of 1.05 g/cm$^3$, if the sample body floats, its density is lower than this adjusted value. In determining the density of the supporting base a small piece of it together with the reinforcement is used as the sample body. In determining the density of the individual layers of the dressing, the sample bodies are taken off a dressed leather or nonwoven needled fleece of natural or synthetic fibers and constitute the individual layers. In determining the density of the second layer, the fibers projecting from the leather or nonwoven needled fleece of natural or synthetic fibers are contained in this second inner layer and are thus taken into consideration. In determining the density of the first outer layer, an optionally applied finish forming part of the first outer layer is also taken into consideration because it cannot be separated.

I claim:

1. A process for providing a dressing on one side of a flat, water-absorbing and water-permeable substrate having a rough surface with depressions at least on that one side to be provided with the dressing, the process comprising the steps of:

(a) heating and advancing in a transport direction a supporting base having an upper side which is textured and consists of silicone caoutchouc and an underside supported on a carrier made of metal at least partially by supplying heat to the carrier;

(b) spraying a first thin-flowing cross-linkable water-containing plastics material dispersion onto the upper side of the heated supporting base in at least one operation in an amount so that at least 20 seconds after the spraying at least 10 percent by volume of the water contained in said first plastics material dispersion is evaporated;

(c) further heating the supporting base by heating the carrier so as to presolidify the first plastics material dispersion spayed onto the heated supporting base by further evaporation of water for forming on the upper side of the supporting base a first presolidified outer layer of the dressing in such a manner that the presolidified first plastics material dispersion contains only a maximum of 15 percent by volume of water while simultaneously texture is formed in situ on a lower surface of this first outer layer adjacent the textured upper side of the supporting base;

(d) applying a second water-containing, thick-flowing, highly viscous, cross-linkable plastics material dispersion having different properties than said first plastics material dispersion in an amount of between 100 and 450 g/m$^2$ onto the rough surface of the flat, water-absorbing and water-permeable substrate to be dressed by means of at least one rotating applicator roll, advancing the substrate in the transport direction of the supporting base on whose upper side the pre-solidified first plastics material dispersion forms the first outer layer of the dressing, and displacing the applicator roll such that relative movement exists between the applicator roll and the advancing substrate so that the second plastics material dispersion is massaged into the rough surface of the substrate;

(e) thereafter but before drying of the second plastics material dispersion, placing the flat, water-absorbing and water-permeable substrate provided with the second material dispersion onto the pre-solidified first plastics material dispersion on the upper side of the supporting base and pressing the flat, water-absorbing and water-permeable substrate onto the advancing supporting base with such a pressure that full surface contact is established between the second plastics material and the pre-solidified first plastics material dispersion disposed on the upper side of the supporting base;

(f) thereafter heating the carrier on which the supporting base is disposed to a temperature of at least 45° C. for a period of at least 15 seconds so that the water contained in the second plastics material dispersion or vapor generated from the water on heating the supporting base is first taken up by the water-absorbing and water-permeable substrate and subsequently is at least partially passed out through the substrate, and the second plastics material dispersion solidifies to form a second inner layer of the dressing, the depressions in the surface of the substrate being essentially completely filled up by the second plastics material dispersion forming said second inner layer of the dressing; and (g) thereafter removing the substrate provided with the dressing formed of the first and second layers from the heated supporting base.

2. The process claimed in claim 1 wherein the supporting base is provided with a reinforcement.

3. The process claimed in claim 2 wherein the reinforcement is at least partially embedded in the supporting base.

4. The process claimed in claim 2 wherein reinforcement is fixed in the underside of the supporting base.

5. The process claimed in claim 2 wherein the reinforcement of the supporting base consists of a net.

6. The process claimed in claim 2 wherein the reinforcement of the supporting base consists of a nonwoven fabric.

7. The process as claimed in claim 2 wherein the reinforcement of the supporting base consists of a woven fabric.

8. The process as claimed in claim 2 wherein the reinforcement of the supporting base consists of metal.

9. The process as claimed in claim 2 wherein the reinforcement of the supporting base consists of glass fiber material.

10. The process as claimed in claim 2 wherein the reinforcement of the supporting base consists of a textile material.

11. The process as claimed in claim 12 wherein the supporting base together with the reinforcement has a density of more than 1.1 g/cm$^3$.

12. The process as claimed in claim 1 wherein the supporting-base upper side has the texture of grained leather.

13. The process as claimed in claim 1 wherein supporting-base upper side has the texture of ground grained leather (nubuk leather).

14. The process as claimed in claim 1 wherein the first plastic material dispersion sprayed onto the upper side of the heated supporting base contains polyurethane.

15. The process as claimed in claim 14 wherein a first water-containing, aliphatic, polyurethane-containing plastic material dispersion is sprayed onto the upper side of the supporting base.

16. The process as claimed in claim 1 wherein the first plastics material dispersion sprayed onto the upper side of the heated supporting base contains polyacrylate.

17. The process as claimed in claim 1 wherein the first plastics material dispersion sprayed onto the upper side of the heated supporting base contains polybutadiene.

18. The process as claimed in claim 1 wherein the first plastics material dispersion is sprayed onto the upper side of the heated, continuously advancing supporting base by means of at least one spraying nozzle disposed above the upper side of the supporting base.

19. The process as claimed in claim 1 wherein the first plastics material dispersion is sprayed onto the upper side of the heated supporting base in at least two successive operations.

20. The process as claimed in claim 19 wherein the plastics material dispersion sprayed onto the upper side of the heated supporting base in different successive operations are at least partially of different compositions.

21. The process as claimed in claim 1 wherein the first plastics material dispersion is sprayed onto the upper side of the heated supporting base in an amount of less than 185 g/m$^2$.

22. The process as claimed in claim 1 wherein the first plastics material dispersion is sprayed onto the heated upper side of the supporting base in such an amount that the first outer layer of the dressing has a mean thickness of less than 0.1 mm.

23. The process as claimed in claim 1 wherein the properties of the first plastics material dispersion are such that after spraying onto the heated upper side of the supporting base, the first outer layer of the dressing has a hardness of between 70 and 100 Shore A.

24. The process as claimed in claim 1 wherein the properties of the first plastics material dispersion are such that after spraying onto the heated upper side of the supporting base, the first outer layer of the dressing has a density of more than 1.05 g/cm$^3$.

25. The process as claimed in claim 1 wherein the first plastics material dispersion has a solids content of more than 30 percent by volume.

26. The process as claimed in claim 1 wherein the first plastics material dispersion contains pigments.

27. The process as claimed in claim 1 wherein the second cross-linkable plastics material dispersion contains polyurethane.

28. The process as claimed in claim 1 wherein the second aqueous cross-linkable plastics material dispersion contains polyacrylate.

29. The process as claimed in claim 1 wherein second aqueous cross-linkable plastics material dispersion contains polybutadiene.

30. The process as claimed in claim 1 wherein the second plastics material dispersion is applied to the substrate in such an amount that the second inner layer of the dressing formed of said second plastics material dispersion is thicker than the first outer layer of the dressing at least in those locations where depressions are present in the surface of the substrate.

31. The process as claimed in claim 1, further comprising the step of introducing air into the second aqueous plastics material dispersion before applying it to the rough surface of the substrate to be dressed.

32. The process as claimed in claim 1 wherein the second aqueous plastics material dispersion is of such properties that the second inner layer of the dressing has a hardness of less than 78 Shore A after application of said second aqueous plastics material dispersion onto the substrate.

33. The process as claimed in claim 1 wherein the properties of the second plastics material dispersion are such that the second inner layer of the dressing is of lower density than the first outer layer of the dressing after applying said second plastics material dispersion onto the substrate.

34. The process as claimed in claim 1 wherein the particle size distribution of the plastics material particles contained in the second plastics material dispersion is between 0.1 and 30 μm.

35. The process as claimed in claim 1 wherein the solids content portion of the second plastics material dispersion amounts to more than 40 percent by volume.

36. The process as claimed in claim 1 wherein solids in the form of hollow microspheres of a diameter of between 0.08 and 0.1 mm and each having a thin thermoplastic shell are provided in at least one of the plastics material dispersions.

37. The process as claimed in claim 1 wherein solids in the form of cellulose particles are provided in at least one of the plastics material dispersions.

38. The process as claimed in claim 1 wherein solids in the form of leather of nonwoven needled fleece of natural or synthetic fibers particles are provided in at least one of the plastics material dispersions.

39. The process as claimed in claim 1 wherein a textile material having a weight of less than 100 $g/m^3$ is embedded in at least one of the aqueous plastics material dispersions before heating and solidification of same.

40. The process as claimed in claim 39 wherein before applying the second aqueous plastics material dispersion by means of at least one rotating applicator roll onto the surface of the substrate to be dressed the textile material is laid onto this surface and is fixed to this surface.

41. The process as claimed in claim 1 wherein a solvent miscible with water is contained in at least one of the plastics material dispersions in addition to water.

42. The process as claimed in claim 41 wherein the solvent is an alcohol.

43. The process as claimed in claim 1, wherein the carrier is a plate made of metal.

44. The process according to claim 1 wherein the carrier is a roll made of metal in conjunction with a flexible supporting base.

45. The process as claimed in claim 1 wherein the carrier is inseparably connected with the supporting base.

46. The process as claimed in claim 1 wherein the substrate provided with the second plastics material dispersion is passed over at least one roll and turned during this passing prior to placing it on the pre-solidified first plastics material dispersion disposed on the upper side of the supporting base and forming the first outer layer.

47. The process as claimed in claim 1 wherein prior to step (d)

the substrate is placed on a second carrier with its side facing away from the rough surface to be provided with the dressing, and the substrate is then turned together with said second carrier and placed onto the pre-solidified first plastics material dispersion located on the supporting base.

48. The process as claimed in claim 47 wherein the second carrier is made of paper.

49. The process as claimed in claim 47 wherein the second carrier is made of textile material.

50. The process as claimed in claim 47 wherein the second carrier is made of a web of plastics material.

51. The process as claimed in claim 1 wherein pressure is exerted in step (d) by elastic pressure means during the solidification of the second polyurethane-containing plastics material onto that side of the substrate disposed on the supporting base which faces away from the side to be provided with the dressing.

52. The process as claimed in claim 1 wherein pressure is exerted by flexible pressure means during the solidification of the second polyurethane-containing plastics material onto that side of the substrate disposed on the supporting base which faces away from the side to be provided with the dressing.

53. The process as claimed in claim 1 further comprising the step of aspirating the vapor generated during the solidification of the second plastics material dispersion.

54. The process as claimed in claim 1 wherein the supporting base is advanced discontinuously at least between the individual process steps.

55. The process as claimed in claim 1 further comprising the step of providing an outer surface of the first outer layer of the dressing with a finish of a transparent liquid plastics material of a thickness of less than 0.08 mm.

56. The process as claimed in claim 55 wherein the transparent liquid plastics material contains polyurethane.

57. The process as claimed in claim 55 wherein the transparent liquid plastics material is pressed onto the first outer layer.

58. The process as claimed in claim 55 wherein the transparent liquid plastics material is sprayed onto the first outer layer.

59. The process as claimed in claim 1 wherein the carrier for the supporting base consists of at least two ropes arranged at a distance from one another.

60. The process as claimed in claim 1 wherein the carrier for the supporting base consists of at least two bars arranged at a distance from one another.

61. The process as claimed in claim 1 wherein the carrier for the supporting base consists of at least two belts arranged at a distance from one another.

62. The process as claimed in claim 1 further comprising the step of aspirating spray generated during the spraying of the first plastics material dispersion onto the upper side of the supporting base together with the vapor generated during the solidification of said first plastics material dispersion.

63. The process as claimed in claim 1 wherein the first aqueous plastics material dispersion and the second plastics material dispersion are applied in amounts such that the total thickness of the dressing formed by the first outer layer and by the second inner layer is less than 0.14 mm.

64. The process as claimed in claim 1 wherein the properties of the first plastics material dispersion and the second plastics material dispersion are such that the vapor permeability of the dressed substrate amounts to more than 0.4 $mg/cm^3h$, measured according to IUP 15.

* * * * *